United States Patent

Morris et al.

[11] 3,985,046
[45] Oct. 12, 1976

[54] CONTROL VALVE FOR A TORQUE CONVERTER LOCK-UP CLUTCH OR THE LIKE

[75] Inventors: Hugh C. Morris, Peoria; Kenneth F. Golan, Pekin; James L. Schmitt, Washington, all of Ill.

[73] Assignee: Caterpillar Tractor Co., Peoria, Ill.

[22] Filed: June 23, 1975

[21] Appl. No.: 589,178

[52] U.S. Cl. .............................. 74/733; 137/625.66; 192/3.31; 192/3.57; 192/103 F; 251/63.4
[51] Int. Cl.² ........................................ F16H 45/02
[58] Field of Search ................. 74/733; 137/625.66; 192/3.31, 3.57, 103 F; 251/63.4

[56] References Cited
UNITED STATES PATENTS
3,857,302  12/1974  Morris ................................. 74/733

*Primary Examiner*—Alan Cohan
*Assistant Examiner*—Gerald A. Michalsky
*Attorney, Agent, or Firm*—Phillips, Moore, Weissenberger, Lempio & Strabala

[57] ABSTRACT

A control valve pressurizes an outlet conduit when a variable fluid pressure signal rises above a first predetermined level and depressurizes the outlet conduit when the variable signal subsequently drops below a second level that is lower than the first level, the valve further functioning to maintain the outlet conduit unpressurized without regard to the variable fluid pressure signal level in the absence of a second fluid pressure signal. The control valve automatically controls a fluid pressure operated lock-up clutch of a torque converter in a vehicle transmission system. The variable fluid pressure signal source may be a governor producing a pressure proportional to vehicle speed while the second fluid pressure signal source is one or more of the transmission drive conditioning devices. The control valve then functions to engage the lock-up clutch to eliminate fluid drive from the vehicle power path at higher vehicle speeds while at higher gear settings but maintains the fluid drive, regardless of vehicle speed, when the transmission is at one or more of the lower speed settings. These control functions are accomplished with a simplified and economical spool valve construction which exhibits a reliable and pronounced hysteresis or snap action to avoid undesirable oscillations in switching the torque converter in and out of the vehicle drive line.

10 Claims, 4 Drawing Figures

FIG. 2.

| | DRIVE DEVICES ENGAGED | LOCK-UP CLUTCH CONDITION | |
|---|---|---|---|
| | | LOW SPEED | HIGH SPEED |
| REV. | 18a & 18g | DISENGAGED | DISENGAGED |
| NEU. | 18d | // | // |
| 1 | 18a & 18f | // | // |
| 2 | 18c & 18f | // | ENGAGED |
| 3 | 18b & 18f | // | // |
| 4 | 18c & 18e | // | // |
| 5 | 18b & 18e | // | // |
| 6 | 18c & 18d | // | // |
| 7 | 18b & 18d | // | // |

CONTROL VALVE FOR A TORQUE CONVERTER LOCK-UP CLUTCH OR THE LIKE

BACKGROUND OF THE INVENTION

This invention relates to valve structures which control other mechanisms in response to fluid pressure signals and more particularly to a simplified valve construction which may activate and inactivate a torque converter in the drive line of a vehicle in response to fluid pressure signals indicative of vehicle speed and of transmission gear setting.

Prior U.S. Pat. No. 3,857,302 of Hugh C. Morris, issued Dec. 31, 1974 for Transmission and Speed Controlled Lockup Clutch, relates to a vehicle drive system including a torque converter and a multi-speed transmission and includes a control valve which automatically engages or disengages a lock-up clutch in the torque converter in response to fluid pressure signals indicative of vehicle speed and of transmission gear setting. The control valve couples the torque converter into the drive path under conditions where that is desirable and bypasses the torque converter, to establish solid mechanical drive under other conditions.

More specifically, it is generally desirable that the torque converter be active in the drive path, without regard to vehicle speed, at the lower gear settings of the transmission. At the higher settings of the transmission the torque converter should be active only at low vehicle speed and should be effectively bypassed as vehicle speed increases. As is understood by those skilled in the art, utilization of a torque converter in the vehicle drive line is desirable at start-up and at low vehicle speeds and while operating in one or more of the lowest gear settings of the transmission in that power throughput is maintained fairly constant over a broad range of vehicle speeds. However, this advantage becomes less significant as vehicle speed increases to higher absolute levels at higher gear settings since speed variations are then proportionately less. Solid mechanical drive, realized by bypassing the torque converter, is basically more efficient from the standpoint of power losses, and at the higher speeds and gear settings, this advantage outweighs the broad torque capabilities of fluid drive. Accordingly, the control valve of prior U.S. Pat. No. 3,897,302 automatically achieves optimum driveline performance by pressurizing a torque converter lock-up or bypass clutch as higher vehicle speeds are reached, but does so only when the transmission is at one of the higher gear settings. The control valve performs a further highly useful function by temporarily re-establishing the fluid drive whenever the transmission is being shifted. This reduces shifting shocks by temporarily removing the solid mechanical drive connection between the driving engine and the transmission during the shifting periods. The temporary substitution of a fluid connection serves to cushion such shocks.

It would be very undesirable if the control valve disconnected the torque converter from the drive path as a specific vehicle speed is reached, and then reconnected the converter when vehicle speed decreased again to the same level. Under that condition, if vehicle speed were to oscillate about that particular level, repeated connection and disconnection of the torque converter would occur. This would produce repeated drive line shocks and greatly aggravate wear of components. Accordingly, the control valve of prior U.S. Pat. No. 3,857,302 avoids such chattering or hunting by exhibiting a hysteresis or snap-action effect. In particular, the vehicle speed value at which the torque converter is effectively bypassed is considerably higher than the speed level at which the torque converter is reconnected back into the drive line. Thus, minor oscillations of speed about some one value do not cause repetitive engagements and disengagements of the torque converter lock-up clutch.

In order to realize the functions described above, the control valve of prior U.S. Pat. No. 3,857,302 has a somewhat complex and costly construction. A valve spool assembly having six separable parts is disposed in a bore which must be machined to include seven axially spaced internal grooves. Further, the degree of hysteresis exhibited by the prior valve is somewhat limited and the pressure values at which the snap action is triggered may fluctuate to a limited extent in practice.

SUMMARY OF THE INVENTION

This invention provides a simplified and less costly control valve of the general type discussed above which operates to pressurize an outlet when a variable fluid pressure signal rises above a first predetermined value, and to subsequently depressurize the outlet when the variable signal drops below a second lower predetermined value, but which maintains the outlet depressurized regardless of the variable pressure signal whenever a second fluid pressure signal is absent. The control valve pressurizes and depressurizes a torque converter lock-up clutch in a vehicle drive system in response to a variable signal indicative of vehicle speed except when a second signal indicates that the vehicle transmission is at one or more of the lowest gear settings. Relative to the prior art, the control valve has a simplified, less costly construction while exhibiting a more pronounced and constant hysteresis or snap-action effect. The control valve does not require draining of governor fluid in order to sense vehicle speed.

Accordingly, it is an object of this invention to provide a simpler and more economical valve construction for pressurizing and depressurizing a conduit in response to variations of a first fluid pressure signal provided that a second pressure signal is present.

It is another object of the invention to provide a valve of the kind described above which exhibits a pronounced and constant hysteresis or snap action in pressurizing and depressurizing the outlet conduit in response to the variable pressure signal.

It is still another object of the invention to improve the performance of vehicle drive systems which include a torque converter.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 2 is a chart showing the ones of the several drive conditioning devices of the vehicle transmission of FIG. 1 that are pressurized at the several different gear settings of the transmission;

DESCRIPTION OF A PREFERRED EMBODIMENT

Figure 1:
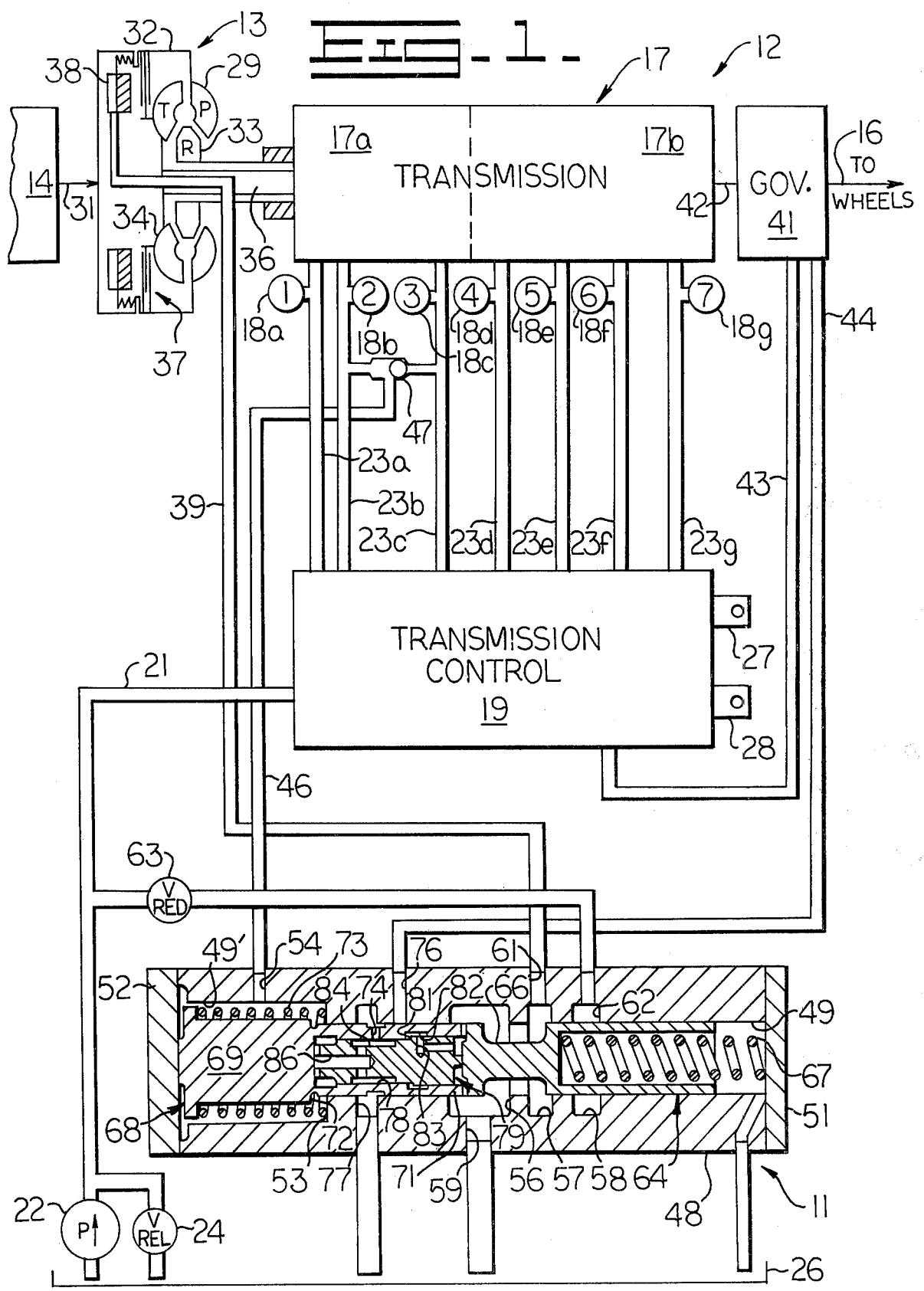
FIG. 1 is an axial section view of a control valve shown coupled to the drive system of a vehicle wherein the vehicle drive system components are illustrated diagrammetically.

Referring initially to FIG 1 of the drawings, the control valve 11 is shown coupled to a vehicle drive system 12 to control the action of a torque converter 13 which is a component of the drive system. The drive system 12 may itself be of conventional construction and accordingly will be herein described only to the extent necessary to understand the coaction of control valve 11 therewith.

Drive system 12 is connected between the engine 14 and the wheel drive line 16 of a vehicle and includes a transmission 17. Transmission 17 may, for example, be of the planetary type disclosed in prior U.S. Pat. No. 3,347,113 in which different drive ratios or gear settings are realized by pressurizing selected combinations of a series of fluid pressure-operated drive conditioning devices 18 which are clutches or brakes associated with planetary gear elements. In this particular example there are seven such drive conditioning devices 18a through 18g, and the transmission provides for seven forward speeds, one reverse speed and neutral. Each particular gear setting is realized by pressurizing a selected pair of the devices 18 with the exception of neutral at which only device 18d is pressurized. The transmission 17 may be functionally separated into a range section 17a with which drive conditioning devices 18a, 18b and 18c, in particular, are associated, and a speed section 17b with which devices 18d through 18g are associated. Any specific gear setting other than neutral is realized by pressurizing a pair of the devices 18, including one device associated with the range section 17a and one device associated with the speed section 17b, the particular combination of devices which are pressurized for each gear setting being unique for that setting. FIG. 2 illustrates the specific pairs of the devices 18 which are pressurized to effect each of the forward and reverse gear settings in this particular transmission.

In order to selectively pressurize the particular devices 18 required to realize a desired gear setting, a transmission control valve assembly 19 has an inlet conduit 21 receiving pressurized fluid from a suitable source such as a pump 22, and has seven outlet conduits 23a through 23g connected to drive-conditioning devices 18a through 18g respectively. A relief valve 24 is connected between conduit 21 and the fluid supply reservoir 26 to limit the maximum pressure in the system. Transmission control valve assembly 19 may be of any of the suitable known constructions such as that described in prior U.S. Pat. No. 3,386,540 for example, and responds to manual movement of a speed selector spool 27 and directional selector spool 28 by directing pressurized fluid from inlet 21 to the particular pair of devices 18 which must be pressurized to establish the transmission gear setting represented by the selected position of the two spools.

Torque converter 13 may also be of conventional construction and thus may have a rotatable impeller 29 coupled to the output element 31 of engine 14 through an annular input member 32. The torque converter also has a stationary reaction element 33 and a turbine element 34 which is mechanically coupled to the input shaft 36 of the transmission 17, and which is fluid coupled to the impeller 29 to establish a fluid drive path between the engine and transmission when desired. In order to bypass the fluid drive and thereby establish solid mechanical drive between the engine and the transmission when desired, a normally disengaged lock-up clutch 37 is coupled between the input member 32 and turbine element 34. Lock-up clutch 37 may be engaged, to essentially inactivate the torque converter, by applying pressurized fluid to an actuator piston and cylinder assembly 38 through an outlet conduit 39 from control valve 11.

To generate a first fluid pressure signal which has a magnitude that varies as a function of the speed of the wheel drive shaft 16, a governor 41 is coupled to the output shaft 42 of the transmission. Governor 41 may be of the known form which has an inlet conduit 43 receiving a fluid supply to transmission control valve assembly 19, and an output signal conduit 44 in which fluid pressure increases as the speed of shaft 42 increases and decreases as the speed of shaft 42 becomes lower. Prior U.S. Pat. 3,450,144 discloses a suitable governor of this type.

For the reasons hereinbefore discussed, it is usually preferable that the lock-up clutch 37 be kept disengaged, to maintain a fluid drive between the engine and transmission, when the transmission is at one or more of the lowest gear settings. In this example, it is desired to maintain the lock-up clutch disengaged whenever the transmission is in the first or low forward gear setting, or in the reverse gear setting. At any of the higher gear settings of transmission 17 it is desirable to maintain the lock-up clutch disengaged only while vehicle speed remains below a predetermined level and then to engage the lock-up clutch, to eliminate the fluid drive between the engine 14 and transmission 17, when vehicle speed rises above that level. Referring now to FIGS. 1 and 2 in combination, it may be seen that neither of drive conditioning devices 18b and 18c is pressurized at the first forward speed or at reverse but that one of these two devices is always pressurized at any higher gear settings. Accordingly, in order to provide a second fluid pressure signal to the control valve 11 that is indicative of the transmission being in either reverse or the lowest forward gear, a second signal conduit 46 is connected between the control valve and both devices 18b and 18c through a double check valve 47. This causes second signal conduit 46 to be pressurized if either of devices 18b and 18c is pressurized, indicating that the transmission is at one of the higher gear settings, and causes conduit 46 to be unpressurized when the transmission is at the first forward gear setting or in reverse, or in neutral.

From the foregoing, it may be seen that the functions required of control valve 11 are to maintain outlet conduit 39 unpressurized whenever there is no pressurization of conduit 46 but to pressurize outlet conduit 39 if second signal conduit 46 is pressurized and at the same time the pressure in first signal conduit 44 rises above a first predetermined value. The control valve should subsequently depressurize outlet conduit 39 if the pressure in conduit 44 decreases to a second predetermined value. The second predetermined pressure value should be lower than the first predetermined value so that the lock-up clutch 37 is not repetitively engaged and disengaged if the pressure in conduit 44 fluctuates about the first value.

Considering now the internal construction of the control valve 11 through which these functions are realized, a valve body 48 may have an internal bore 49 with end closures 51 and 52, the bore having enlarged diameter portion 49' adjacent end closure 52 that forms an annular shelf 53 in conjunction with the remainder of the bore. The second signal conduit 46 is communicated with the enlarged portion 49' of the bore through an inlet passage 54.

Three spaced-apart grooves 56, 57 and 58 are formed in the smaller diameter region of bore 49 at progressively greater distances from the enlarged diameter portion 49' of the bore. A drain passage 59 communicates groove 56 with the fluid reservoir 26 while an outlet passage 61 of the control valve connects the intermediate groove 57 with outlet conduit 39 to the lock-up clutch 37 of the torque converter. Still another passage 62 connects groove 58 with the pressurized fluid supply conduit 21 through another reducing valve 63. The additional reducing valve 63 is provided as the lock-up clutch 37 may require less actuating pressure than do the several drive conditioning devices 18 of the transmission.

Pressurization or depressurization of the outlet 61 is controlled by a first valve spool element 64 disposed for axial movement within the small-diameter portion of bore 49 in the region of the grooves 56, 57 and 58. First spool element 64 has a groove 66 which communicates groove 56 with groove 57, to depressurize outlet 61 when the spool element is at an unshifted or leftward position, as viewed in FIG. 1, and which closes groove 57 from groove 56 while communicating groove 57 to supply groove 58, to pressurize the element 61, when shifted towards closure 51 or rightwardly as viewed in FIG. 1. First spool element 64 is biased toward the leftward position, at which outlet 61 is unpressurized, by a compression spring 67 which extends from end closure 51 into an axial bore in the adjacent end of spool element 64. Thus, the outlet 61 is maintained unpressurized except at such times as the spool element 64 is shifted axially against the force of spring 67.

The initial portion of the movement of first spool 64 required for pressurizing the outlet 61, is effected by a second spool element 68 which has a flanged head portion 69 situated within bore enlargement 49' and which has an annular skirt extension 71 of lesser diameter extending into the smaller-diameter portion of bore 49 to groove 56. Extension 71 abuts the end of first spool element 64 when the first spool element is at the above-described unshifted position. A compression spring 73 in bore portion 49' urges the second spool element 68 toward the unshifted position which is the leftward position as viewed in FIG. 1.

The juncture between the head and extension portions 69 and 71 of the second spool element 68 forms an annular step 72 which limits rightward travel of the second spool element, by abutting the end of bore portion 49', prior to the time that the first spool element 64 has been shifted sufficiently to communicate outlet groove 57 with supply groove 58. However, this movement is sufficient to bring a radial passage 74 in the extension 71 of the second spool element into communication with a first pressure signal inlet passage 76 in the wall of valve body 48, passage 76 being communicated with the first pressure signal conduit 44 from governor 41. When the second spool element 68 is at the leftward position, the radial passage 74 is communicated with another drain groove 77 of bore 49.

Figure 3:
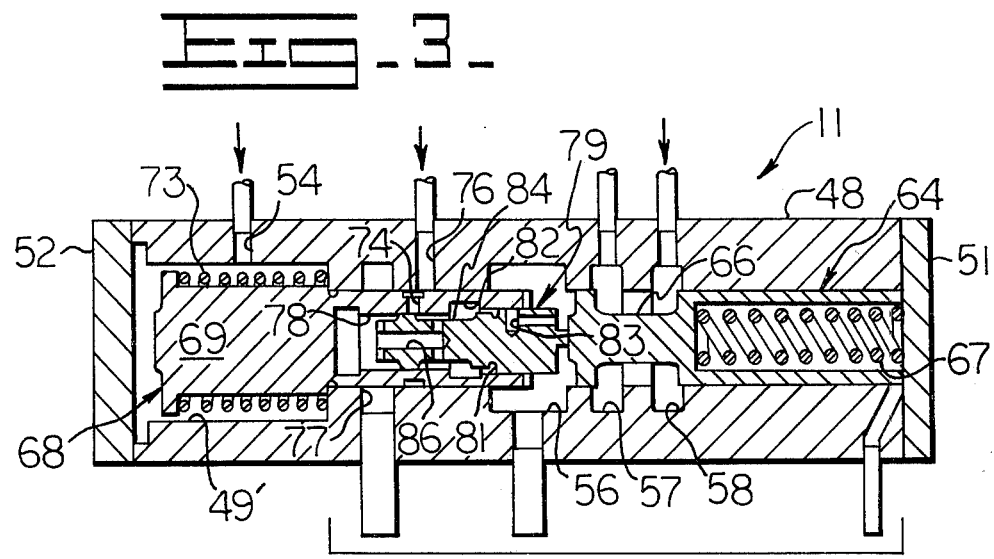
FIG. 3 is another axial section view of the control valve of FIG. 1 wherein movable elements of the valve assembly are shown shifted to an alternate position.

Thus, when the second spool element is held in the unshifted position by spring 73, the interior bore 78 of the control valve is unpressurized. When the second spool element is shifted rightwardly by pressure in bore portion 49', owing to pressurization of one of the drive conditioning devices 18b or 18c, fluid pressure from the governor 41 is then transmitted to the bore 78 of the spool. A third spool element 79 is disposed in bore 78 and responds to a rising pressure from the governor by shifting the first spool element 64 still further rightwardly as shown in FIG. 3 until a point is reached at which outlet groove 57 is communicated with supply groove 58 and the lock-up clutch 37 of the torque converter is thereby engaged. The final portion of spool travel to the position at which the control valve outlet is pressurized is accomplished rapidly with a snap action, as will hereinafter be described in greater detail.

The third spool element 79 and the bore 78 of spool 69 within which it is contained are both stepped to have a larger diameter at the right end, as viewed in FIG. 1, than at the left end, thereby forming an annular step 81 on the third spool element 79. An internal groove 82 of spool bore 78 is located to encircle the step 81 when the third spool element is at a retracted position at which it abuts the inner end of bore 78. A passage 83 in third spool element 79 communicates bore groove 82 with drain groove 56 of bore 49 when the third spool is at the retracted position. With the spools at the above-described position, a groove 84 of third spool element 79 is in communication with the previously described passage 74 of second spool element 68 and the groove 84 is in turn communicated with the left end of spool bore 78 by an internal passage 86 within third spool element. Groove 84 of third spool element 79 is of sufficient length in the axial direction to communicate radial passage 74 with groove 82 of the second spool element 68 when all three spool elements are shifted the maximum possible distance to the right, to the positions shown in FIG. 3.

In operation, all three spool elements 64, 68 and 79 are held in the unshifted or leftward position as illustrated in FIG. 1 by the action of springs 67 and 73 whenever transmission drive conditioning devices 18b and 18c are both unpressurized. As may be seen by reference to FIG. 2, this condition obtains in the reverse, neutral and first forward gear settings of the transmission. At all higher gear settings one or the other of devices 18b or 18c is pressurized. Thus, with the transmission in either reverse, neutral or first forward gear setting, outlet 61 of the control valve 11 is unpressurized and the torque converter lock-up clutch 37 is maintained disengaged to include fluid drive in the power path between the engine and the transmission. It should be observed that the lock-up clutch 37 is maintained disengaged at these gear settings regardless of vehicle speed as the governor fluid pressure inlet 76 of the control valve 11 is blocked by spool extension 71 at this time, and governor fluid pressure cannot effect any movement of the spool elements.

When the transmission 17 is shifted into one of the higher gear settings at which the lock-up clutch 37 should engage at higher vehicle speeds but not at low speeds, one or the other of the drive conditioning devices 18b and 18c is pressurized, and such pressure is transmitted through second signal conduit 46 to control valve bore section 49'. This pressure acts against the head of second spool element 68 to shift the second spool element rightwardly until step 72 abuts the inner end of bore section 49'. This movement also forces both third spool element 79 and first spool element 64 a small distance to the right, but the movement is not in itself sufficient to communicate supply groove 58 with outlet groove 57. However, such movement is sufficient to move radial passage 74 of the second spool element into communication with the governor fluid pressure inlet 76. Governor fluid pressure is then transmitted to passage 86 to act against the left end of third spool element 79 and to thereby tend to urge the third spool element and first spool element 64 still further to the right. Such movement is resisted by spring 67 which has a spring constant sufficient to prevent groove 84 of the third spool element from moving into communication with groove 82 until such time as the governor fluid pressure rises to a value corresponding to a vehicle speed at which it is desired to engage the lock-up clutch 37 to establish solid mechanical drive. When the governor fluid pressure does rise to that value, third spool element 79 is moved sufficiently to the right to bring groove 84 into communication with groove 82 and, as previously pointed out, the shifting of second spool element 68 has brought radial passage 74 into communication with governor fluid inlet passage 76. The further movement of the third spool element has also caused passage 83 to move out of communication with groove 82. Thus, at that point in the operation of the control valve, governor fluid pressure is suddenly applied to step 81 of the third spool element 79.

As the governor fluid pressure is now suddenly acting on a broader total area of the third spool element 79, the third spool element is rapidly driven still further to the right until such movement is stopped by abutment of the first spool element 64 against end closure 51, the spool elements having now reached the position depicted in FIG. 3. At the FIG. 3 position, outlet groove 57 has been blocked from drain groove 56 and is now communicated with supply groove 58. This pressurizes conduit 39 to the lock-up clutch 37 thereby bypassing the torque converter and establishing solid mechanical drive.

Figure 4:
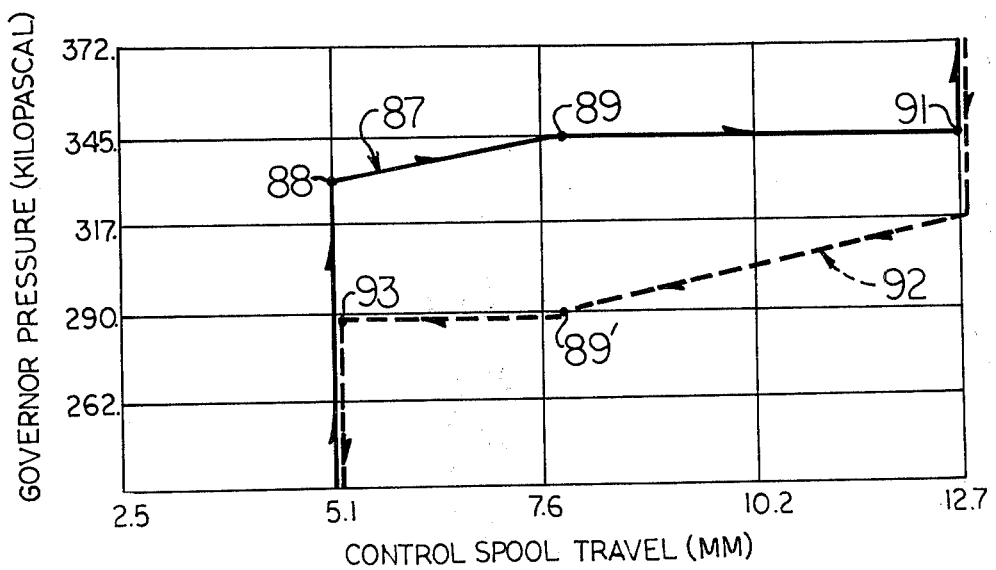
FIG. 4 is a graphical depiction of the movement of the spool of the control valve of FIG. 1 in response to variations of the transmission output speed.

Referring now to FIG. 4, the solid line 87 represents the actual travel of first spool element 64 in a typical existing example of the control valve during the sequence of operations described above, commencing with the point at which the spools have already been moved a small distance to the right by the pressurization of drive conditioning device 18b or 18c. As previously described, this conditions the valve to respond to governor fluid variations. As the governor fluid pressure begins to rise, initially there is no further movement of first spool element 64 since the fluid pressure from the governor is insufficient to overcome the counterforce of spring 67. When a predetermined governor fluid pressure, represented by point 88, is reached, rightward spool movement begins and the extent of such movement increases as the governor fluid pressure rises. At point 89, groove 84 has been shifted sufficiently to communicate governor fluid pressure with the step 81 of the third spool element to abruptly increase the effective area of the third spool element. The third spool element then drives the first spool element abruptly to the right to point 91 and the lock-up clutch is pressurized.

To avoid hunting or chattering of the control valve elements or repeated engagement and disengagement of the lock-up clutch if vehicle speed oscillates around the value 89 at which the lock-up clutch is first pressurized, it is desirable that the pattern of return movement of the spools be different from that represented by solid line 87 and that such pattern of return movement, represented by dashed line 92 in FIG. 4, provide for hysteresis in the response to the valve to governor pressure. In other words, as governor pressure drops in response to slowing of the vehicle, the valve spool does not snap back at the same pressure level at which the snap action occurred as the governor pressure rose. Instead, upon a lowering of the governor pressure, the spool moves gradually leftward until it has reached a point 89' corresponding to that at which the snap action first commenced during the rising pressure phase of operation. At that point 89' the spool then snaps back leftwardly until a point 93 is reached at which drain passage 83 of the third spool element 79 is again communicated with groove 82. Thereafter, the spool retraces the pattern of movement which occurred when governor pressure first began to rise.

The reason that the pattern of return movement of the spool differs from that which occurs in response to a rising governor pressure is that as governor pressure begins to drop, spring 67 is able to gradually shift the several spool elements leftwardly, as viewed in FIG. 3, but no abrupt change in the fluid pressures resisting such movement occurs until groove 84 of the third spool element moves just out of communication with groove 82 while drain passage 83 is simultaneously moving into communication with groove 82. At that point fluid pressure stops acting on step 81 of the third spool element 79. With the effective area of the third spool element 79 abruptly decreased, spring 67 is able to shift spool elements 64 and 79 rapidly to the left through the position at which outlet groove 57 is blocked from supply groove 58 while being communicated with drain groove 56. Accordingly, the control valve also exhibits a snap action on the return movement in which the lock-up clutch is depressurized but does so at a lower level of governor fluid pressure.

The control valve 11 further operates to momentarily re-establish fluid drive during the periods that the transmission is undergoing a shift thereby cushioning shifting shocks in the vehicle drive line. Transmission control 19 vents both devices 18b and 18c at the beginning of each shift and this momentarily relieves the fluid pressure in valve bore portion 49'. Springs 73 and 67 are then able to return all three spool elements to the left, depressurizing outlet groove 57, until such time as device 18b or 18c may be repressurized at the conclusion of the transmission shift.

While the invention has been described with respect to a single preferred embodiment, it will be apparent that many modifications are possible and it is not intended to limit the invention, except as defined in the following claims.

What is claimed is:

1. A control valve for pressurizing a fluid-operated device when a variable first fluid pressure signal rises above a first predetermined value, and for subsequently depressurizing said device only after said first fluid pressure signal drops to another predetermined value which is lower than said first value, and which maintains said device unpressurized without regard to said first fluid pressure signal whenever a second fluid pressure signal is absent, comprising:

means forming a valve body having a bore therein and having a first fluid pressure signal passage, a second fluid pressure signal passage, a pressurized fluid supply passage and an outlet passage, each of said passages being communicated with a separate portion of said bore;

a first spool element disposed in said bore for axial movement therein between an unshifted position at which said outlet passage is blocked from said supply passage and a shifted position at which said outlet passage is communicated with said supply passage;

first resilient means urging said spool element toward said unshifted position thereof, a second spool element disposed in said bore for axial movement therein, said second spool element being movable by fluid pressure received through said second signal passage from one position to another position at which said second spool element urges said first spool element to an intermediate position between said unshifted and shifted positions thereof, a third spool element disposed in said bore between said first and second spool elements for urging said first spool element still further towards said shifted position thereof, said third spool element having first and second surfaces facing away from said first spool element; and passage means positioned to communicate said first fluid pressure signal passage with said first surface when said first spool element reaches said intermediate position thereof and for communicating said first fluid pressure signal passage with said second surface only after said first spool element has been moved past said intermediate position thereof by pressure acting on said first surface of said third spool element.

2. The combination defined in claim 1 wherein said third spool element has a drain passage positioned to drain fluid pressure from the region of said second surface prior to said movement of said third spool element relative to said second spool element, said drain passage being positioned to be blocked from said region of said second surface by the movement of said third spool element which communicates said first fluid pressure signal passage with said region of second surface.

3. The combination defined in claim 1 wherein said first spool element has means for communicating said outlet passage with a drain at said unshifted position of said first spool element.

4. The combination defined in claim 1 further comprising second resilient means for opposing the force of said second fluid pressure signal on said second spool element.

5. The combination defined in claim 1 wherein said second spool element has an axial bore in the end closest to said first spool element, and wherein said third spool element is disposed at least in part in said axial bore of said second spool element.

6. The combination defined in claim 5 wherein said first spool element has an axial bore in the end remote from said second and third spool elements and wherein said first resilient means is a compression spring extending into said axial bore.

7. The combination defined in claim 5 wherein said axial bore of said second spool element has a length at least equal to that of said third spool element, and wherein said third spool element is wholly contained within said bore of said second spool element when said first spool element is at said unshifted position and is partially extended from said second spool element by first pressure signal when said first fluid pressure signal is above a predetermined pressure value.

8. A control valve as defined in claim 1 in combination with a vehicle drive system having a torque converter for establishing a fluid drive path from an engine to a transmission and having a fluid pressure-operated lock-up clutch for bypassing said fluid drive path to establish solid mechanical drive between said engine and said transmission, said transmission having at least one fluid pressure-operated drive conditioning device which is pressurized at higher gear settings of said transmission and unpressurized at at least one lower gear setting thereof, said drive system further having governor means for producing a fluid pressure signal which is a function of the output speed of said transmission, further comprising a first flow conduit communicating said first fluid pressure signal passage with said governor means, a second flow conduit communicating said second fluid pressure signal passage with said drive conditioning device, and a third flow conduit communicating said outlet passage with said lock-up clutch.

9. A control valve for pressurizing a fluid pressure-controlled device when a variable first fluid pressure signal is above a first predetermined value and for then depressurizing said device when said first signal drops below a second lower predetermined value but which maintains said device unpressurized, without regard to said first signal, if a second fluid pressure signal is absent, comprising:

a valve body having a bore therein which is closed at each end, said bore having a head end portion of greater diameter than the other end portion to form a step between said two portions, said valve body having a first drain passage, a first fluid signal passage, a second drain passage, an outlet passage, a pressurized fluid supply passage and a third drain passage each communicated with separate axially spaced-apart regions of said other end portion of said bore at points which are progressively more distant from said head end portion thereof, said valve body further having a second signal passage communicated with said head end portion of said bore, a first spool element disposed for axial movement within said other end portion of said bore between an unshifted position at which said first spool element communicates said outlet passage with said second drain passage while blocking said outlet passage from said fluid supply passage and a shifted position at which said outlet passage is blocked from said second drain passage while being communicated with said fluid supply passage, first spring means for urging said first spool element towards said unshifted position thereof, a second spool element disposed for axial movement within said head end portion of said bore in response to said second fluid pressure signal, said second spool element having a hollow smaller-diameter extension extending into said other end portion of said bore, said second spool element being movable by said second fluid pressure signal from an unshifted position to a shifted position at which said second spool element causes said first spool element to move to a position intermediate between said unshifted and shifted positions thereof, second spring means urging said second spool element towards said unshifted position thereof, a third spool element situated between said first and second spool elements and extending into said hollow extension of said second spool element, said third spool element having an annular step thereon within said hollow extension and facing said head end portion of said bore, first passage forming means for communicating said first signal passage with the end of said third spool element which is remote from said first spool element when said second spool element is at said shifted position thereof, second passage forming means for communicating said first signal passage with said annular step of said third spool element when said third spool element is shifted relative to said second spool element from a retracted position to a partially extended position by first signal pressure acting on said end of said third spool element, third passage forming means for communicating said end of said third spool element with said first drain passage only when said second spool element is att said unshifted position thereof, and fourth passage forming means for communicating said annular step with said second drain passage only when said third spool element is at said retracted position thereof.

10. The combination set forth in claim 9 wherein said third spool element has an annular groove thereon communicated with said end thereof and wherein said second spool element has a radial passage in said extension thereof positioned to communicate said groove with said first drain passage when said second spool is at said unshifted position thereof and to communicate said groove with said first signal passage when said second spool element is at said shifted position.

* * * * *